United States Patent [19]

Tenebruso

[11] 4,415,173

[45] Nov. 15, 1983

[54] WHEELED CORNER MEMBERS FOR LUGGAGE

[76] Inventor: Jerry C. Tenebruso, 31-07 91st St., Jackson Heights, N.Y. 11369

[21] Appl. No.: 276,954

[22] Filed: Jun. 24, 1981

[51] Int. Cl.³ .............................................. B62B 3/02
[52] U.S. Cl. .................................. 280/47.13 R; 16/30
[58] Field of Search .............. 280/37, 47.13 R, 47.32, 280/DIG. 3; 16/30; 190/18 A

[56] References Cited

U.S. PATENT DOCUMENTS

| | | | |
|---|---|---|---|
| 2,174,661 | 10/1939 | Hope | 16/30 |
| 2,777,708 | 1/1957 | Paterson | 280/37 |
| 2,964,329 | 12/1960 | Beck | 280/47.13 R |

FOREIGN PATENT DOCUMENTS

| | | | |
|---|---|---|---|
| 205413 | 9/1959 | Fed. Rep. of Germany | 280/35 |
| 552374 | 4/1943 | United Kingdom | 280/37 |

*Primary Examiner*—David M. Mitchell
*Assistant Examiner*—Joseph McCarthy

[57] ABSTRACT

A set of four corner members adapted to receive the four corners of a piece of stiff-sided luggage which lie in a single plane, each of the members being interconnected with its adjacent corner member by elongated elastic members which hold the corner members in position with respect to the luggage and with respect to each corner member.

2 Claims, 5 Drawing Figures

WHEELED CORNER MEMBERS FOR LUGGAGE

BACKGROUND OF THE INVENTION

The present invention concerns a means for providing removable wheeled corner members for luggage (four in number) which are adapted to receive any four co-planar corners of a piece of stiff-sided luggage and elastic means for securing the wheeled corners firmly in position to accommodate wide variances in the size of the luggage which may be so equipped.

There have been many prior attempts to provide caster rollers, for example, for the base of a piece of luggage which snap in place for use and which are readily removable when the caster rollers are not in use. Prior art patents which disclose apparatus of this type are U.S. Pat. Nos. 2,964,329, 3,889,965 and 3,861,703. However, each of the foregoing patents either require that the luggage be specially constructed to provide attachment means for the caster rollers and their supports or provide straps which secure the rollers to the luggage.

The present invention provides a means for attaching castered rollers and support members therefor to adjacent corners of stiff-sided luggage in a manner which does not require the luggage to be specially constructed to receive the corner members and in a manner which permits the apparatus of the present invention to adapt itself to a wide range of sizes of luggage. No straps or special attachments are required.

SUMMARY OF THE INVENTION

The present invention provides in combination four wheeled corner members for luggage each comprising a flat rectangular base, a caster roller attached to and depending from said base, two flat sides extending perpendicularly from said base in a direction opposite to said roller and being joined to said base along two contiguous sides thereof and being joined to each other along contacting sides thereof, each said corner member being adapted to closely fit around one corner of a stiff-sided piece of luggage. Elongated elastic members are connected to and extend between each said base. Elongated elastic members are connected to the sides of one corner member and are connected to and extend between the sides of another corner member, four corner members and said elongated members being arranged in a quadrilateral with the sides of each corner member disposed away from the center of said quadrilateral, said quadrilateral arrangement being adapted to receive four co-planar corners of a piece of stiff-sided luggage having corners separated by a greater distance than the corresponding relaxed length of said elastic members between adjacent corner members within the normal elastic elongation of said members.

DESCRIPTION OF A PARTICULAR EMBODIMENT

Figure 1:
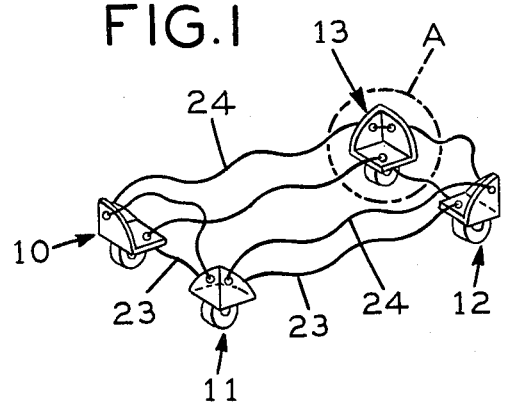
FIG. 1 illustrates the interrelationship of the four wheeled corner members of the invention with interconnecting elastic members in an unrestrained or collapsed condition.
Figure 2:
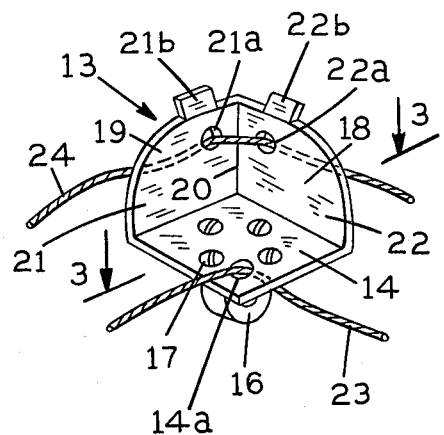
FIG. 2 is an enlarged detail of one of the corner members of FIG. 1 shown encircled and designated by the reference letter "A"
Figure 3:
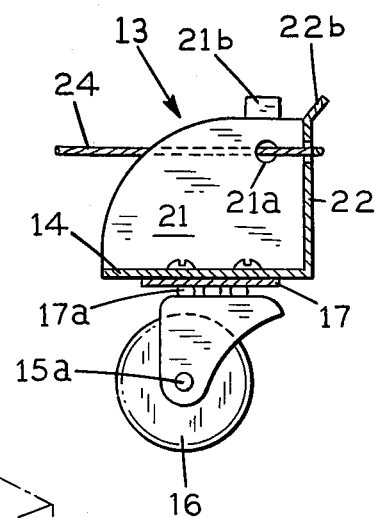
FIG. 3 is a section taken in the direction of arrows 3—3 of FIG. 2.

Referring now to the drawing and initially to FIGS. 1–3 thereof, wheeled corner members 10–13 are shown as they might be arranged prior to their placement about the base of a piece of luggage. As shown in FIG. 2, each of the corner members consists of a flat rectangular base 14 which supports a caster roller 16 depending therefrom.

FIG. 3 illustrates the roller 16 secured to bracket 15 by means of pin 15a. The bracket 15 is rotatably secured to mounting plate 17 by a pin (not shown). Roller bearings 17a are located intermediate bracket 15 and plate 17. Plate 17 is attached to the base 14 by screws. Flat upstanding side members 18 and 19 are joined at 20 to each other and to the base at 21, 22. Thus, as illustrated the base member 14, together with the side members 21, 22, form a corner-shaped receptacle to receive a corner of a piece of luggage. Each of the corner members 10–13 are identical, and corner member 13 is therefore representative. The base member 14 defines an aperture 14a and side members 21 and 22 define apertures 21a and 22a. Similar apertures will be found in the corner members 10, 11 and 12. Tabs 21b and 22b permit the respective sides to be grasped more easily. Joining the bases of adjacent corner members are elastic cords 23 which pass through the apertures therein and interconnect each of the corner members. The side members are interconnected by an elastic cord 24 which passes through the apertures in the respective side members. The elastic cords 23 and 24 should have the capacity to extend in length three or four times their length in a relaxed state while maintaining a strong steady pull.

Figure 4:
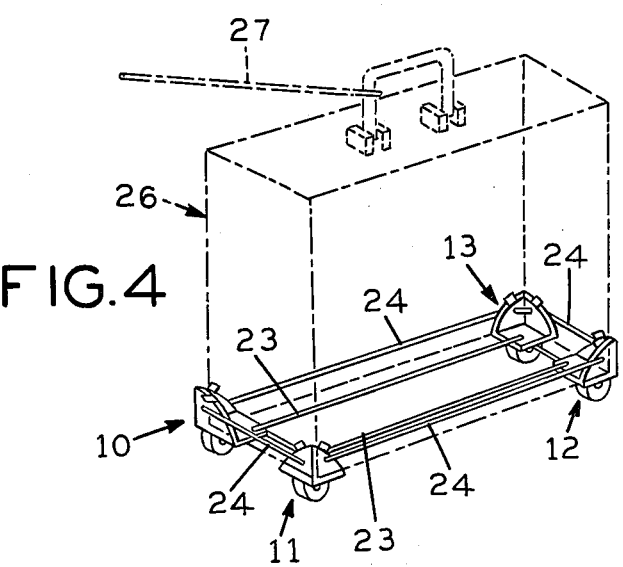
FIG. 4 is a perspective view illustrating the positioning of the four wheeled corner members of the invention about adjacent co-planar corners of a piece of luggage with the interconnecting plastic members securing the respective corner members in position about the base of the luggage.

FIG. 4 illustrates the apparatus of the present invention as it might be applied to a small piece of luggage. Accordingly, each of the corner members 10, 11, 12 and 13 are arranged sequentially about the base corners of a piece of luggage 26. Because of their construction, each corner member fits closely about the vertical sides and receives the horizontal base of the luggage. Base elastic cords 23 exert pull or tension upon adjacent corner members to draw adjacent corner members toward each other. Similarly, the side cords 24 draw adjacent vertical sides of the corner members toward each other. No other means of attaching the four corner members to the base of the luggage is needed since the tension applied by the two elastic cord systems 23 and 24 will be sufficient to hold the corner members snugly at all times about the luggage. A pull strap is sufficient to permit easy towing.

Figure 5:
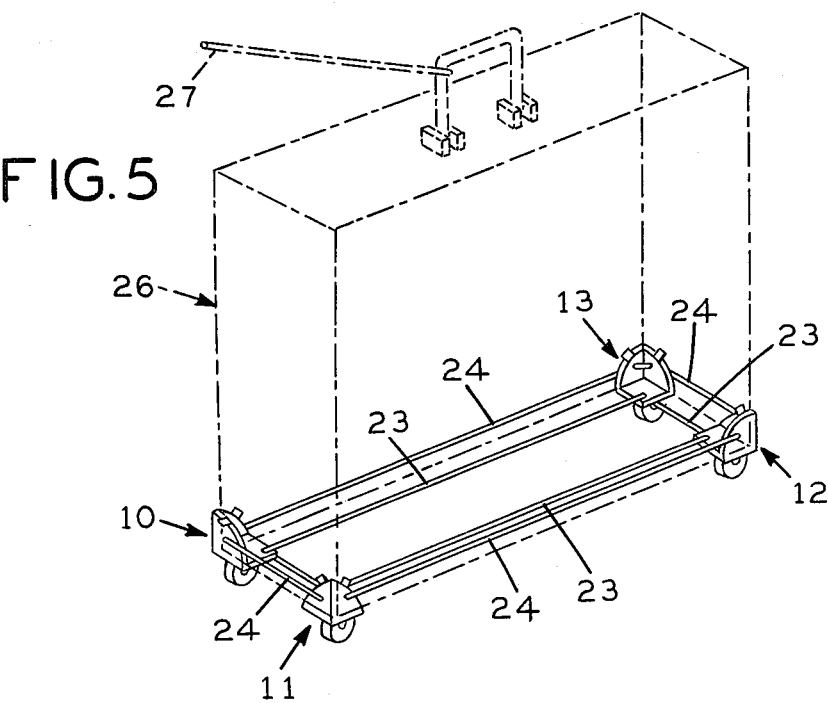
FIG. 5 is a view similar to FIG. 3 illustrating the identical positioning of the corner members but with respect to a larger piece of luggage.

FIG. 5 illustrates the apparatus of the present invention in relation to a larger piece of luggage and shows the capacity of the present apparatus to accommodate different sizes of luggage. In fact, the apparatus of the invention can readily provide wheeled support to trunks or other large containers as well as to smaller sizes of luggage.

It will be understood that the foregoing description has been of a particular embodiment and is therefore representative. In order to appreciate the scope of the invention, reference should be made to the appended claims.

I claim:

1. In combination, four, wheeled corner members for luggage each comprising a flat rectangular base, a caster roller attached to and depending from said base, two flat sides extending perpendicularly from said base in a direction opposite to said roller and being joined to said base along two contiguous sides thereof and being joined to each other along contacting sides thereof, each said corner member being adapted to closely fit around a base corner of a rectangularly based oblong-sided stiff piece of luggage, the base of each corner member being in contact with the base of said piece of luggage and the flat sides of each corner being in contact with the sides of said luggage adjacent to the base thereof, elongated elastic members connected to and interconnecting each said base of a corner member, elongated elastic members connected to the side of one corner member and connected to and interconnecting the side of another corner member along each respective side of said luggage, the corners of said luggage which are in contact with said corner members being separated by a greater distance than the relaxed length of each said elastic member between adjacent corner members within the normal elastic elongation of said members.

2. The combination according to claim 1 in which the elongated elastic members connected to the base portions of each corner member extend parallel to and underneath the respective sides of a rectangular sided piece of luggage and the elastic members which interconnect the sides of a corner member are separate from the elastic members interconnecting the base portions of a corner member.

* * * * *